June 9, 1936.  G. F. YAGER ET AL  2,043,568
CLUTCH MECHANISM
Filed Oct. 26, 1933
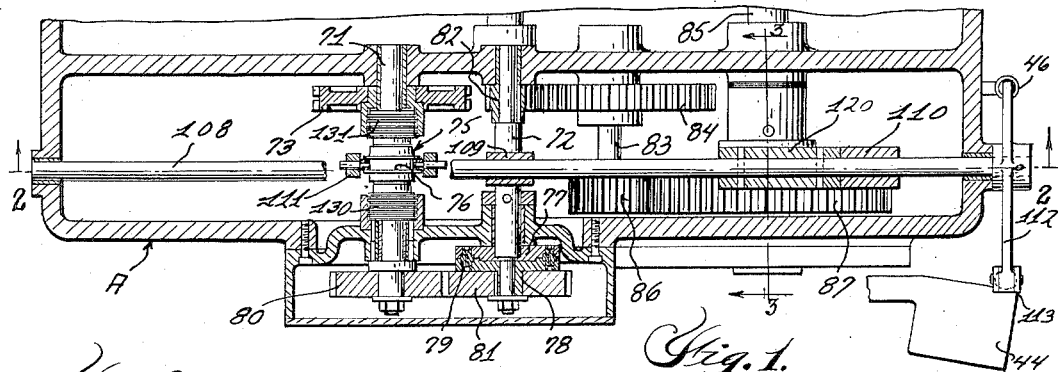
Fig. 1.
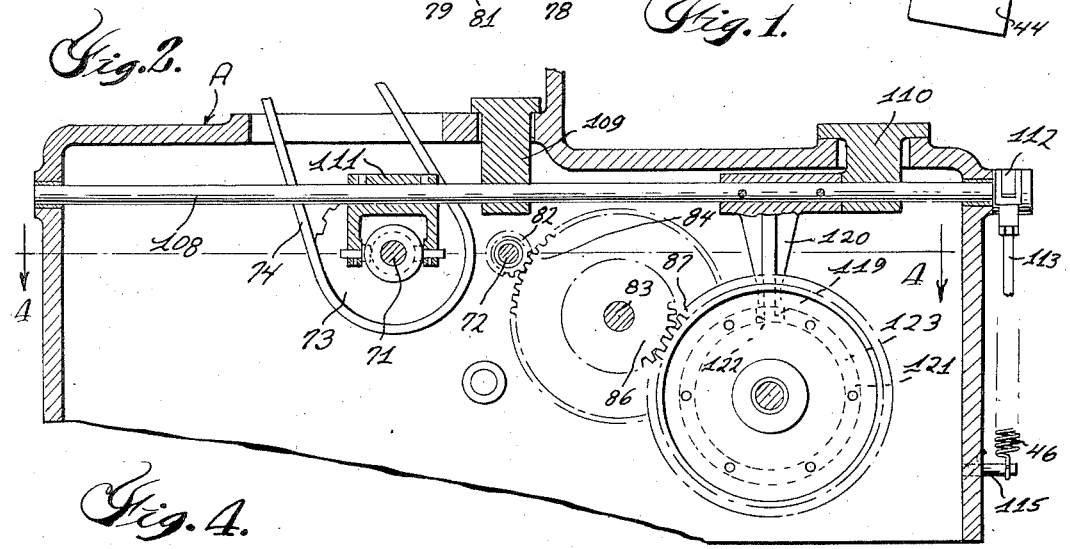
Fig. 2.
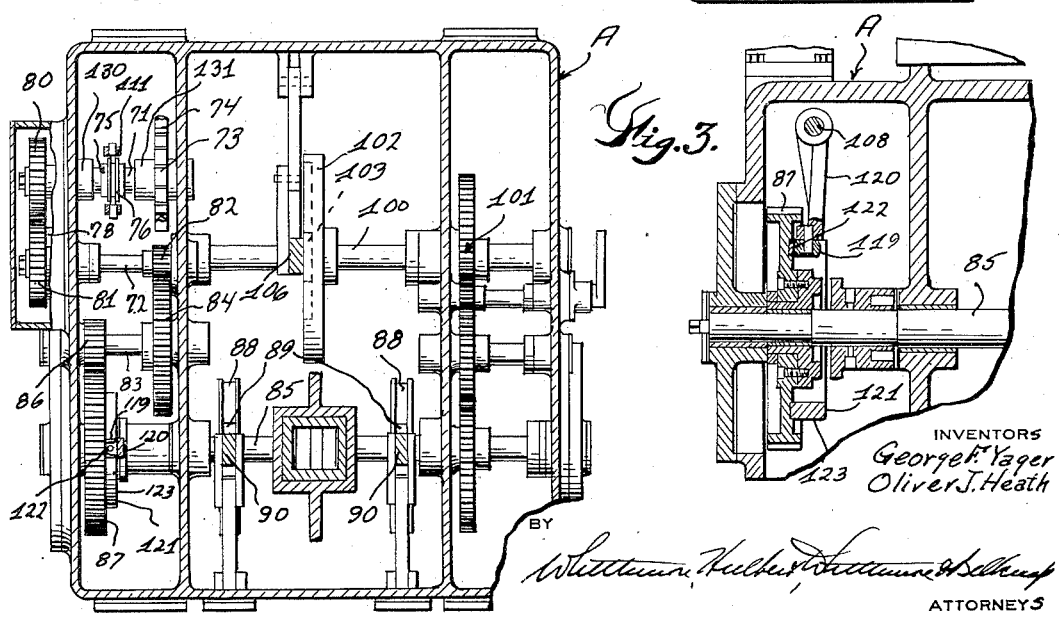
Fig. 4.
Fig. 3.
INVENTORS
George F. Yager
Oliver J. Heath
BY
ATTORNEYS Patented June 9, 1936

2,043,568

UNITED STATES PATENT OFFICE 2,043,568

CLUTCH MECHANISM

George F. Yager and Oliver J. Heath, Toledo, Ohio, assignors to The Bunting Brass and Bronze Company, Toledo, Ohio, a corporation of Ohio Application October 26, 1933, Serial No. 695,347

2 Claims. (Cl. 192—33)

This invention relates generally to a clutch and brake mechanism for use in molding apparatus of the type illustrated in our pending application, Serial No. 560,454.

One of the essential objects of the invention is to provide a mechanism of the type mentioned wherein both the clutch and brake are under the control of a single operating member.

Another object is to provide a mechanism wherein the operating member is at a point remote to the clutch and brake and may be operated by a foot of the operator so that his hands may be free for other purposes.

Another object is to provide a mechanism wherein means is provided in association with the remote control means just mentioned for holding for a predetermined period the clutch in an operative position after it has been actuated by the operating member.

Another object is to provide a mechanism wherein means carried by a rockshaft is operable when the shaft is actuated in one direction by an operating member for rendering the clutch effective and the brake ineffective and is operable when the shaft is actuated in the opposite direction by a spring for rendering the clutch ineffective and the brake effective.

Other objects, advantages and novel details of construction of this invention will be made more apparent as this description proceeds, especially when considered in connection with the accompanying drawings, wherein:—

Figure 1 is a horizontal sectional view through an apparatus having clutch and brake mechanism embodying our invention;

Figure 2 is a vertical longitudinal sectional view taken substantially on the line 2—2 of Figure 1;

Figure 3 is a vertical transverse sectional view taken substantially on the line 3—3 of Figure 1;

Figure 4 is a horizontal sectional view taken substantially on the line 4—4 of Figure 2.

Referring now to the drawing, A is the main frame of a molding apparatus; 71 and 72, respectively, are parallel shafts journaled in the frame; 73 is a pulley loose on shaft 71 and driven by a belt 74 from a motor (not shown); and 75 is a combination brake and clutch on shaft 71 and having a shifting collar 76. 77 is a disc rigid with shaft 72, and 78 is a sleeve upon a reduced portion of shaft 72 and connected by shearable pins 79 to disc 77. 80 and 81, respectively, are change speed gears rigid with shaft 71 and sleeve 78; 82 is a pinion rigid with shaft 72; 83 is a shaft journaled in the frame; 84 is a gear rigid with shaft 83 and driven by pinion 82; 85 is a shaft journaled in the frame; 86 is a pinion rigid with shaft 83; and 87 is a gear rigid with shaft 85 and driven by pinion 86. 88 are cams fixed to shaft 85; 89 are rollers engaging said cams; 90 are links connected to said rollers and adapted to actuate a squeeze table (not shown) of the molding apparatus; 100 is a shaft journaled in the frame A; 101 represents gearing driving the shaft 100 from shaft 85; 102 is a cam fixed to shaft 100; 103 is a roller engaging the cam 102; and 106 is a suitable driver for a ram (not shown) of the molding apparatus connected to roller 103.

In the present instance the shifting collar 76 of the clutch and brake assembly 75 is preferably indirectly connected to a pedal 44 so as to be actuated thereby. As shown, 108 is a rockshaft journaled in bearings 109 and 110 carried by the frame A; 111 is a yoke fixed to the rockshaft 108 and connected to the collar 76 at diametrically opposite points thereof; 112 is a rocker fixed to the rockshaft 108; and 113 is a link terminally connected to the rocker 112 and pedal 44. The spring 46 for the pedal 44 is terminally connected to the rocker 112 and to a pin 115 fixed to the frame A.

In order that shaft 85 will be limited to one complete revolution each time the pedal 44 is depressed, we have provided a roller 119 carried by a lever 120 fixed to rockshaft 108 and alternately engageable with an edge 121 of and a recess 122 in a ring 123 fixed to one side of gear 87. Preferably the arrangement is such that the roller 119 is withdrawn from the recess 122 by the lever 120 when the pedal 44 is depressed. At the same time the collar 76 is shifted by the yoke 111 to release the brake 130 and render the clutch 131 operative to connect the pulley 73 to shaft 71. As a result gear 87 will rotate shaft 85 and in doing so will cause ring 123 to turn therewith. The roller 119 will then ride on edge 121 of ring 123 holding clutch 131 engaged until gear 87 completes one revolution whereupon roller 119 will be returned by spring 46 into recess 122 in ring 123, releasing clutch 131 and causing brake 130 to become operative.

What we claim as our invention is:

1. In combination, a driven shaft, drive means for the driven shaft, a clutch controlling the operation of the driven shaft by the drive means, a rotatable shaft, a driving connection between the rotatable shaft and the driven shaft including a gear on the rotatable shaft, actuating means for said clutch including a rockshaft, a shifter fork carried by the rockshaft and operatively connected to said clutch, a rocker arm rigid intermediate its ends with the rockshaft, an operating pedal, a link terminally connected to said pedal and rocker arm, and a spring anchored at one end and connected at the other to said rocker arm, and means for limiting rotation of the rotatable shaft to one complete revolution each time the pedal is depressed including a ring fixed to and projecting laterally from one side of the gear, the outer edge of said ring being substantially parallel to said side of the gear and having a recess therein, an arm rigid with the rockshaft, and an anti-friction element carried by the last mentioned arm and alternately engageable with the edge and recess.

2. In combination, a driven shaft, drive means for the driven shaft, a clutch controlling the operation of the driven shaft by the drive means, a rotatable shaft, a driving connection between the rotatable shaft and the driven shaft including a gear on the rotatable shaft, actuating means for said clutch including a rockshaft, a shifter fork carried by the rockshaft and engaging said clutch, a rocker arm rigid intermediate its ends with the rockshaft, an operating member, a link terminally connected to said member and rocker arm, a spring anchored at one end and connected at the other to said rocker arm, and means associated with said gear for limiting rotation of the rotatable shaft to one complete revolution each time the member aforesaid is operated.

GEORGE F. YAGER.
OLIVER J. HEATH.